May 14, 1968 C. W. LARKAM ETAL 3,382,715
SOLION CURRENT METER
Filed June 29, 1965
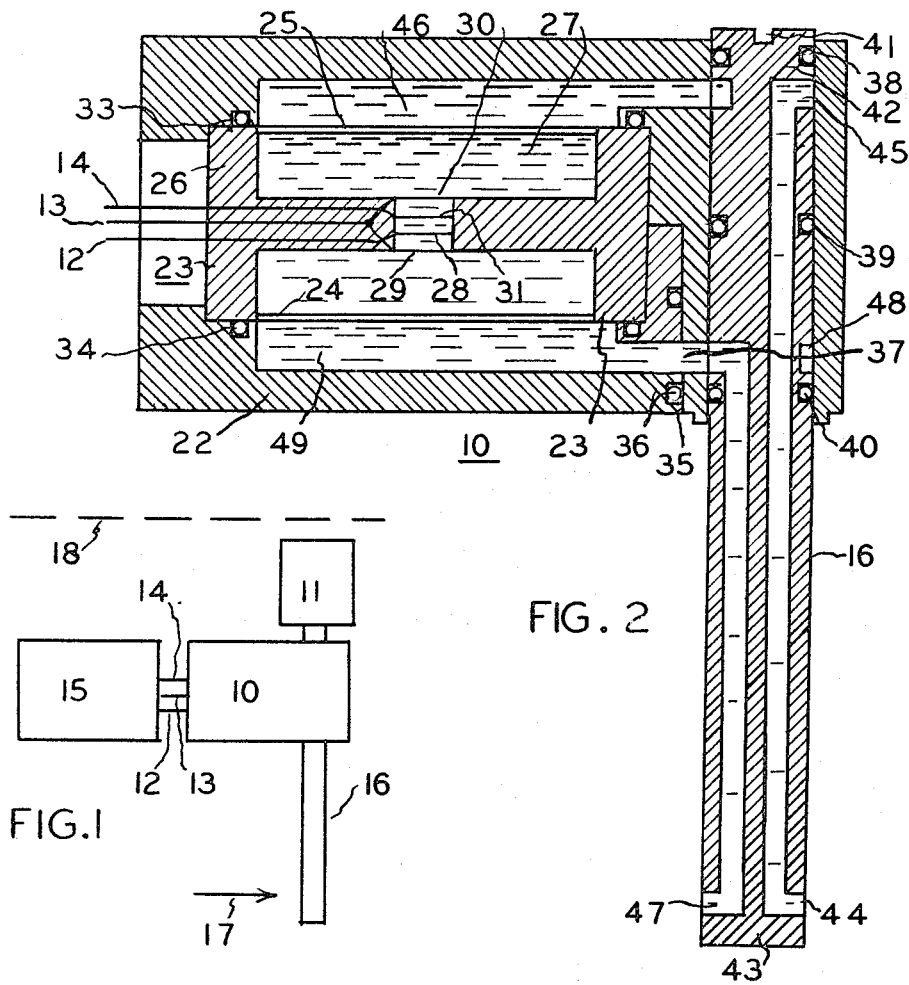
FIG. 1
FIG. 2
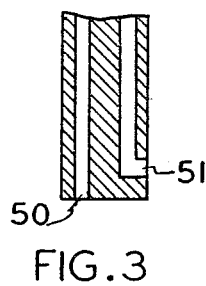
FIG. 3
INVENTORS
CHARLES W. LARKAM
RICHARD J. MILLER

United States Patent Office 3,382,715
Patented May 14, 1968

3,382,715
SOLION CURRENT METER
Charles W. Larkam, Austin, Tex., and Richard J. Miller, River Forest, Ill., assignors, by direct and mesne assignments, to the United States of America as represented by the Secretary of the Navy
Filed June 29, 1965, Ser. No. 468,170
6 Claims. (Cl. 73—212)

ABSTRACT OF THE DISCLOSURE

This invention relates to an improved flow meter including a solion transducer having first and second liquid cavities adjacent first and second flexible faces of the transducer and coupled through a rotating probe having two liquid passages therein to a moving fluid stream. The variation due to velocity pressure is received at the flexible diaphragms of the solion transducer and varied by rotation of the probe. The resulting signal is calibrated as flow in a sensing device.

---

The invention described herein may be manufactured and used by or for the Government of the United States of America for governmental purposes without the payment of any royalties thereon or therefor.

This invention relates to a solion current meter and more specifically to an improved device for measuring the relative speeds of fluids passed a measuring device.

A problem has existed for sometime in developing instrumentation for measuring relatively low velocities of liquids such as those in the oceans or rivers wherein the relative motion between the existing devices and the substantially slow moving bodies of fluid create certain inherent limitations which made sensing these fluid flows difficult. For example, vane-type current meters which can measure down to tenths of knots per hour are intended to be laboratory devices with very delicate rotors and will not operate for long periods of time in remotely placed locations. Impact tubes have been used in laboratory studies for measuring flow speeds, however lack of suitable transducers for measuring the low pressure produced by a low stream velocity has kept these from becoming practical. In addition, none of these provided independent means for sensing direction of the stream.

It is an object of this invention to provide an improved current measuring device.

It is yet another object of this invention to provide means whereby a current flow can be measured down to extremely low velocities in feet per minute.

It is still another object of this invention to provide an improved fluid flow meter comprising a housing, a pressure sensitive transducer in the housing, first and second fluid cavities in the housing positioned adjacent the transducer, fluid in the cavities, first and second nozzles filled with fluid communicating with the cavities, the nozzles allowing fluid pressures in a moving stream to be communicated to the cavities, and means for rotating the nozzles.

A further object of this invention is to provide an improved fluid flow meter which is capable of measuring the direction of fluid flow in a moving body of fluid.

Other objects, advantages and novel features of the invention will become apparent from the following detailed description of the invention when considered in conjunction with the accompanying drawings wherein:

FIGURE 1 shows somewhat schematically the solion current meter operating to measure the current of a moving body of water;

FIGURE 2 is a sectional view in the plane of the paper through the longitudinal axis of the current meter of FIGURE 1; and FIGURE 3 shows a second embodiment of the invention.

The operation of and structure for the invention will be discussed in conjunction with the figures.

FIGURE 1 shows a current meter 10 utilizing the invention being driven by a drive motor 11 and having its output connected by leads 12, 13 and 14 to a signal processing circuit 15. Extending below the current meter is a rotating head 16 sensing the current flow represented by an arrow 17 below a surface 18 of moving body of water.

FIGURE 2 is a sectional view along a plane intersecting the longitudinal axis of current meter 10, in the plane of the paper in FIGURE 1. Inside of a housing 22, is a solion transducer 23 which is shown in a somewhat idealized form since anyone of several such devices could be used. A pair of diaphragms 24, 25 affixed to a housing 26 and confine therebetween a liquid 27.

Operation of a solion transducer of the general type represented by 23 in FIGURE 2 is described briefly as follows. Liquid 27 is an aqueous solution of the chemical species $I_2$ and KI. The KI, which is present in much higher concentration than the $I_2$, is completely dissociated into $K^+$ and $I^-$ ions. The cathodes, 28 and 31, are relatively sheltered from the bulk solution and are so biased, by an electrical supply in the signal processing circuit 15, that $I_2$ reaching their surfaces is immediately converted to iodide ions by the acquisition of electrons. Electrons are simultaneously given up to the external circuit at anodes 29 and 30, causing the reverse reaction to occur there at the same rate and thus keeping the overall composition of the electrolyte constant. The electrical current at each cathode is proportional to the rate at which $I_2$ reaches it by diffusion and convection.

In the device shown in FIGURE 2, the periodic reversal of the pressure acting across the solion transducer keeps the diaphragm excursions small. Accordingly, the governing impedance to fluid motion through the porous cathodes is the fluid friction within the cathodes themselves, and the electrolyte flow rate is proportional to the differential pressure developed in the rotating head by the water current to be measured. Although the electrolyte current at each cathode is a non-linear function of the electrolyte velocity, the difference of these cathode currents is directly proportional to the electrolyte velocity, and hence to the acting pressure differential.

The solion transducer 23 has the form of a short cylinder with its axis vertical. Although it is shown in this position, it is to be understood that it may be mounted with its axis horizontal or any position in between. It is sealed inside of body 22 by rubber O rings 33 and 34. The body comes apart at a joint 35 for insertion of solion 23. O ring 36 seals a fluid channel 37 passing through the joint. The three O rings, designated as 38, 39, 40 provide dynamics seals for a core 42, which is rotatably mounted and can be operated by the motor 11, not shown in FIGURE 2 for the sake of clarity, connected by a coupling to a slot 41. Probe 16 rotates with core 42 and carries a sensing head 43 with it. A nozzle 44 communicates with a groove 45 around the upper part of the core, and in turn with a fluid cavity 46 above the pressure transducer 23. A nozzle opening 47 communicates with a groove 48 around the lower part of the core and in turn with a fluid cavity 49 below the pressure transducer 23. The fluid cavity and channels connecting them with the nozzles 44, 47 are filled with a fluid whose external velocity is being measured, in order to transmit the pressure to the solion transducer. Solion output terminals 12, 13, and 14 are connected in a conventional manner to a battery and load resistor (not shown) to a strip chart recorder or other suitable display device in signal processing circuit 15.

The construction is clearly such that the direct kinetic head of a stream flowing in a plane normal to the probe axis is converted into an alternating differential pressure acting across the solion pressure transducer at the frequency of probe revolution. The maximum differential pressure developed between the probe nozzle 44, 47 is actually somewhat greater than the kinetic head of the stream, because when one nozzle is facing directly upstream the other nozzle is directed downstream. Rotation of the probe yields a peak-to-peak differential pressure signal having twice the amplitude of the maximum direct pressure.

The current speed is given by the formula:

$$\text{Speed} = C_1 \sqrt{P_p/\rho}$$

where $P_p$ is the peak-to-peak pressure developed by the nozzles 44, 47, $\rho$ is the density of the stream fluid, and $C_1$ is the dimensionless constant (having a value around 0.8) which allows for the contribution of the downstream nozzle. The stream speed formula can also be written in the form;

$$\text{Speed} = C \sqrt{I_p}$$

where $I_p$ is the peak-to-peak value of the solion output current;

$C$ is then $C_1/\sqrt{\rho S}$ where S is the solion sensitivity. For accurate measurements, C is best determined by actual calibration. A typical solion can readily resolve a pressure of 0.2 dynes per square centimeter, which corresponds to a current speed of 0.01 knot for water.

The electrical output from the current meter can be used for remote indication of the direction as well as the speed of the current. Direction information is conveyed by the phase of the alternating output signal. For this purpose, a switch (not shown) is coupled to the probe rotation mechanisms so that it gives a current pulse at the instant the probe rotates through the position which points the positive pressure nozzle due North or some other arbitrary reference direction. The positive pressure nozzle is considered the one which causes the output signal of the solion to have positive polarity when the differential nozzle pressure is positive. This current pulse can be either transmitted on a separate circuit or superimposed on the solion output, to be separated from the regular signal at the receiving station by suitable electrical filters. The solion output wave form resulting from the differential pressures sensed by the probe nozzle may peak sharply. The phase angle between the positive going pressure peak and the pulse denoting the reference direction is a direct measure (after correction for the phase shift, for the solion) of the angle between the current vector and reference direction.

FIGURE 3 shows another embodiment of the invention wherein the nozzles that are immersed in the stream and rotated are shown as 50 and the other 51 and placed so that nozzle 50 is normal to the direction of liquid flow, and nozzle 51 which is rotating is alternately pointed upstream and downstream. In such a system the pressure differential measured is not twice that of the stream as shown in the first embodiment.

It should be noted that although this invention is shown measuring the velocity of liquid flow, that is water, it is also capable of measuring air velocities by the same means.

It is also possible to mount a current meter such as this to orient itself with the direction of current flow if chosen.

Obviously many modifications and variations of the present invention are possible in the light of the above teachings. It is therefore to be understood that within the scope of the appended claims the invention may be practiced otherwise than as specifically described.

We claim:
1. A fluid flow meter, comprising:
   (a) a housing;
   (b) a pressure sensitive transducer in said housing having first and second pressure sensitive surfaces; said transducer being capable of generating an electrical signal upon receiving different pressures at said first and second surfaces;
   (c) first and second fluid cavities in said housing, positioned adjacent said first and second pressure sensitive surfaces of said transducer;
   (d) fluid in said cavities;
   (e) first and second nozzles filled with said fluid communicating with said cavities, said nozzles allowing fluid pressures in a moving stream to be communicated to said cavity;
   (f) means for rotating said nozzles to produce different pressure signals at said first and second surfaces due to the variations of velocity head pressures in said moving stream; and
   (g) means coupled to receive electrical signals from said transducer to indicate said stream velocity.

2. A fluid flow meter, comprising:
   (a) a housing;
   (b) a pressure sensitive transducer in said housing having first and second pressure sensitive surfaces; said transducer being capable of generating an electrical signal upon receiving different pressures at said first and second surfaces;
   (c) first and second fluid cavities in said housing, positioned adjacent said first and second pressure sensitive surfaces of said transducer;
   (d) fluid in said cavities;
   (e) an elongated rotatable member mounted in said housing having a pressure sensing head;
   (f) first and second nozzles in said head filled with said fluid communicating with said cavities, said nozzles allowing fluid pressures in a moving stream to be communicated to said cavity to produce different pressure signals at said first and second surfaces due to the variations of velocity head pressures in said moving stream;
   (g) means for rotating said member; and
   (h) means coupled to receive electrical signals from said transducer to indicate said stream velocity.

3. A fluid flow meter, comprising:
   (a) a housing;
   (b) a pressure sensitive solion transducer in said housing having first and second pressure sensitive diaphragm surfaces, said transducer producing electrical signals in response to changes of pressure against said first and second surfaces;
   (c) first and second fluid cavities in said housing, positioned adjacent said first and second pressure sensitive surfaces of said transducer;
   (d) fluid in said cavities;
   (e) an elongated rotatable member mounted in said housing having a pressure sensing head;
   (f) first and second nozzles in said head filled with said fluid communicating with said cavities, said nozzles allowing fluid pressures in a moving stream to be communicated to said cavity; and
   (g) means for rotating said member.

4. The meter of claim 3 wherein there is provided a signal circuit for receiving said electrical signals and for providing a readable output therefrom.

5. The meter of claim 3 wherein there is provided means for orientating said meter with respect to a given compass bearing and an electrical signal generated thereby giving the direction of current flow with respect to said given compass bearing.

6. A fluid flow meter, comprising:
   (a) a housing;

(b) a pressure sensitive solion transducer in said housing having first and second pressure diaphragm surfaces, said transducer producing electrical signals in response to changes in pressure against said first and second surfaces;

(c) first and second fluid cavities in said housing, positioned adjacent said first and second pressure sensitive surfaces of said transducer;

(d) fluid in said cavities;

(e) an elongated rotatable member having first and second elongated passageways extending substantially along said member, individual ends of said first and second passageways connecting to said first and second cavities and filled with said fluid;

(f) first and second nozzles in said head filled with said fluid and connecting to said passageways, said nozzles allowing fluid pressures in a moving stream of fluid to be communicated through said first and second elongated passageways to said diaphragm surfaces; and (g) means for rotating said member.

References Cited

UNITED STATES PATENTS

| | | | |
|---|---|---|---|
| 3,149,491 | 9/1964 | Sissenwine et al. | 73—182 X |
| 2,846,878 | 8/1958 | Carbonara | 73—212 X |
| 3,116,635 | 1/1964 | McQuitty | 73—88.5 |

RICHARD C. QUEISSER, *Primary Examiner.*

E. GILHOOLY, *Assistant Examiner.*